N. H. SHERBURNE & E. S. SKINNER.
COOKING ATTACHMENT TO COAL-OIL STOVES.
No. 191,553. Patented June 5, 1877.
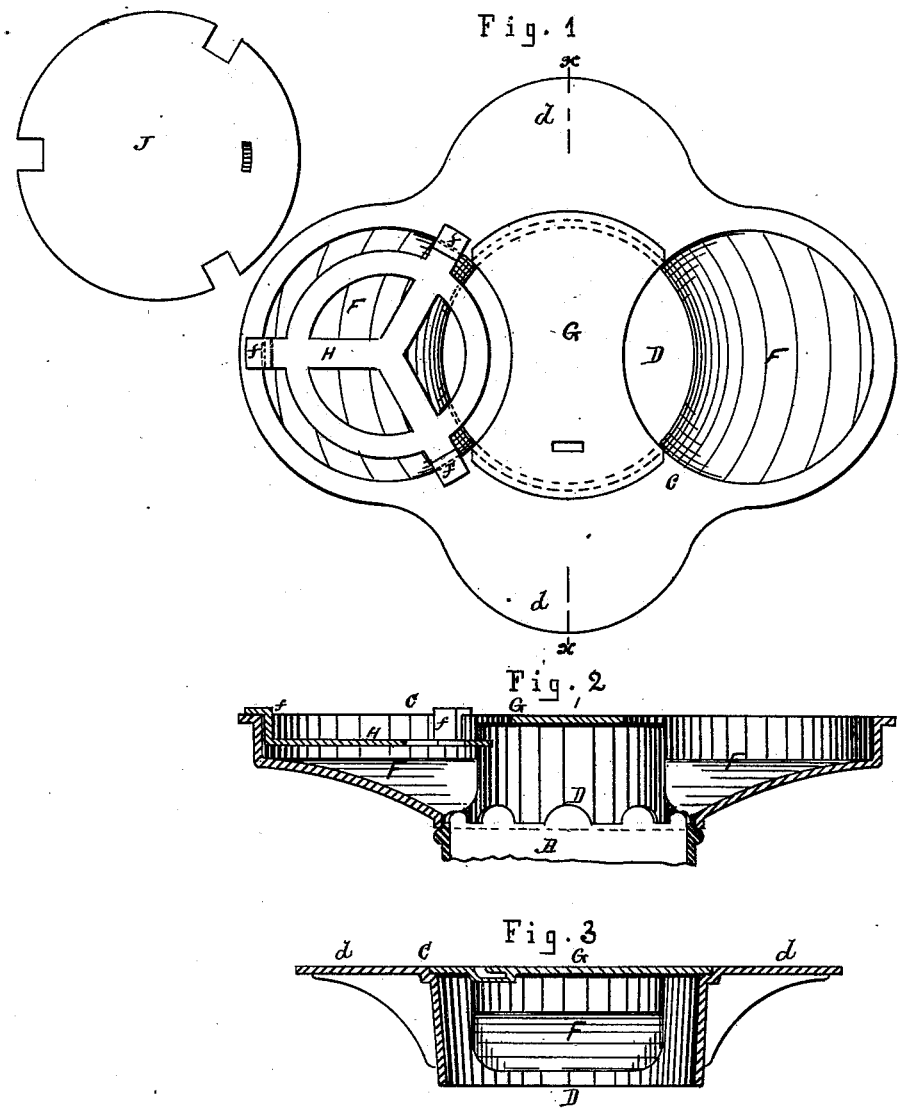

UNITED STATES PATENT OFFICE

NORMAN H. SHERBURNE, OF CHICAGO, AND EDWIN S. SKINNER, OF LAKE FOREST, ILLINOIS.

IMPROVEMENT IN COOKING ATTACHMENTS TO COAL-OIL STOVES.

Specification forming part of Letters Patent No. 191,553, dated June 5, 1877; application filed April 30, 1877.

*To all whom it may concern:*

Be it known that we, NORMAN H. SHERBURNE, of Chicago, in the county of Cook, and EDWIN S. SKINNER, of Lake Forest, in the county of Lake, State of Illinois, have invented new and useful Improvements in Cooking Attachments for Coal-Oil Stoves; and we do hereby declare the following to be a full, clear, and exact description thereof, which will enable others skilled in the art to which our invention appertains to make and use the same, reference being had to the accompanying drawing, forming a part of this specification, in which—

Figure 1 represents a general plan or top view of a cooking attachment for coal-oil stoves embodying our invention. Fig. 2 represents a central sectional elevation of the same, showing its connection with the heating-drum of the stove; and Fig. 3 represents a transverse sectional elevation of the same, taken on the line *x x* drawn across Fig. 1.

Like letters of reference indicate like parts.

Our invention relates to that class of cooking attachments used in connection with the heating-drum of a coal-oil stove for supporting the cooking-utensil so as to bring the latter in contact with the products of combustion; and the object of our invention is to simplify the construction of such attachments, and to so arrange the same that several cooking-utensils may be heated at the same time.

To that end our invention consists in the arrangement and construction of the several parts, as hereinafter more fully described and claimed.

In the drawing, A represents the heating-drum of a coal-oil stove, which may be made as shown, or in any other suitable and known form. C represents a cast-metal cap or top, provided with a central opening, D, of the proper diameter to secure the upper end of the heating-drum A of the stove, as shown in Figs. 2 and 3, and with circular heating-chambers F F arranged on opposite sides of said opening D, and communicating therewith, as shown in Fig. 1. The heating-chambers are of the proper diameter to allow the lower portion of the cooking-utensil to loosely enter therein, and so as to leave a space between the wall of the utensil and wall of the chamber, and the walls of said chambers are of the proper height to hold the bottom of the utensil placed therein above the upper surface of the lower wall or bottom of the chamber, when the enlarged portion of the utensil is resting upon the side walls of the chamber, as shown by dotted lines in Fig. 2, and so as to leave an unobstructed space between the bottom of the utensil and the lower wall or bottom of the chamber.

The lower wall or bottom of each of the heating-chambers is inclined or curved inward and downward to a point near the lower edge of the wall of the opening D, so as to allow the heat to freely pass from the heating-drum of the stove into the respective chambers, under and around the lower portion of the cooking-utensil.

G represents a removable center-plate, the ends of which are fitted into grooves formed in the upper part of the wall of the opening D, between the chambers F F, as shown in Fig. 1. The sides of said plate are made to describe the arc of a circle corresponding with the circle described by the side walls of the chambers, and so that when the plate is properly adjusted the opening in the respective chambers will describe a true circle.

The upper surface of the cap or top proper is made to project laterally, and in a horizontal plane from the upper edge of the walls of the opening D, as shown in Figs. 1 and 3, so as to form shelves *d d*, upon which small utensils may be placed for the purpose of keeping the contents thereof warm when the heating-chambers are otherwise employed.

H represents a removable disk, arranged to loosely enter the heating-chambers, and is provided with upward-projecting arms *f*, which are curved at their upper ends, so as to rest upon the upper edge of the walls of the chamber, and hold the disk slightly above the upper surface of the bottom of the chamber, as shown in Fig. 2, the object being to form a support for cooking-utensils which are too small to rest upon the walls of the chamber. The disk is provided with a series of openings through which the heat can freely pass to, and in contact with, the cooking-utensil.

J is a removable cover, of the proper size to close the heating-chamber, and is provided with notches formed in its periphery, through which the upward-projecting arms of the disk can loosely pass.

The object of making the center-plate G removable is to admit of casting the top C in one piece, and to admit of removing the plate when large vessels, such as wash-boilers, and others of similar character, are to be heated, so as to allow the heat to come in direct contact with the entire length of the lower surface of such vessel; and the object of inclining or curving the lower walls or bottoms of the heating-chambers inward and downward, as described, is to increase the space between the said lower wall and the bottom of the cooking-utensil at the point of communication with the heating-drum of the stove, and so as to allow the heat to radiate more freely from the said drum into the respective chambers.

Having thus described our invention, what we claim as new, and desire to secure by Letters Patent, is—

1. The removable top C of a coal-oil stove, cast in one piece, and provided with the central opening D, heating-chambers F F, and removable center-plate G, substantially as and for the purpose specified.

2. The removable top C of a coal-oil stove, provided with the central opening D, and one or more heating-chambers, F F, having the lower wall or bottom thereof curved or inclined inward and downward, substantially as and for the purpose specified.

3. The removable top C of a coal-oil stove, provided with the central opening D, heating-chambers F F, and one or more shelves, d d, substantially as and for the purpose specified.

4. The combination, with the removable top C of a coal-oil stove, provided with one or more heating-chambers, F F, of the removable disk H, provided with the arms f, for suspending the disk within the chamber, substantially as and for the purpose specified.

NORMAN H. SHERBURNE.
EDWIN S. SKINNER.

Witnesses:
N. C. GRIDLEY,
T. H. GAULT.